United States Patent
Dietrich

(10) Patent No.: US 7,281,493 B2
(45) Date of Patent: Oct. 16, 2007

(54) MILKING DEVICE PROVIDED WITH CLEANSING MEANS

(75) Inventor: Berthold Johannes Theodorus Dietrich, Gorssel (NL)

(73) Assignee: Rieberjo B.V., Gorssel (NL)

( * ) Notice: Subject to any disclaimer, the term of this patent is extended or adjusted under 35 U.S.C. 154(b) by 0 days.

(21) Appl. No.: 10/393,431

(22) Filed: Mar. 20, 2003

(65) Prior Publication Data

US 2003/0226520 A1 Dec. 11, 2003

Related U.S. Application Data

(63) Continuation of application No. PCT/NL01/00699, filed on Sep. 21, 2001.

(30) Foreign Application Priority Data

Sep. 22, 2000 (NL) ............................................. 1016237

(51) Int. Cl.
*A01J 3/00* (2006.01)

(52) U.S. Cl. ................... 119/14.02; 119/14.02
(58) Field of Classification Search ............. 119/14.18, 119/14.1, 14.08, 14.02, 14.13
See application file for complete search history.

(56) References Cited

U.S. PATENT DOCUMENTS

| | | | | | |
|---|---|---|---|---|---|
| 2,747,544 | A | * | 5/1956 | Thomas ................... | 119/14.13 |
| 3,973,520 | A | * | 8/1976 | Flocchini ................. | 119/14.08 |
| 4,333,421 | A | * | 6/1982 | Schluckbier ............. | 119/14.08 |
| 4,378,757 | A | * | 4/1983 | Hamann ................... | 119/14.02 |
| 4,586,462 | A | * | 5/1986 | Icking ....................... | 119/14.1 |
| 5,722,343 | A | * | 3/1998 | Aurik et al. ............. | 119/14.02 |
| 5,778,820 | A | * | 7/1998 | van der Lely et al. .... | 119/14.18 |
| 5,896,828 | A | * | 4/1999 | Kronschnabel et al. .. | 119/14.46 |
| 5,909,716 | A | * | 6/1999 | van der Lely ........... | 119/14.08 |
| 5,960,736 | A | * | 10/1999 | Ludington et al. ....... | 119/14.08 |
| 6,009,833 | A | * | 1/2000 | van der Lely ........... | 119/14.02 |
| 6,244,215 | B1 | * | 6/2001 | Oosterling ............... | 119/14.02 |
| 6,367,416 | B1 | * | 4/2002 | van der Lely et al. .... | 119/14.02 |
| 2004/0089242 | A1 | | 5/2004 | Verstege et al. | |
| 2006/0112886 | A1 | | 6/2006 | Rottier et al. | |

FOREIGN PATENT DOCUMENTS

| | | |
|---|---|---|
| DE | 26 22 794 A | 12/1977 |
| NL | 0630557 A2 * | 12/1994 |
| WO | 99 66787 | 12/1999 |

* cited by examiner

*Primary Examiner*—Son T. Nguyen
*Assistant Examiner*—Bethany L. Griles
(74) *Attorney, Agent, or Firm*—Ladas & Parry LLP

(57) ABSTRACT

Device for pneumatically milking a cow, comprising a number of milk extractors, each comprising a teat cup as well as milk line connected to the lower end of the teat cup, which line leads from the teat cup to a collection chamber for the milk from the teat cup, each milk extractor being provided with a supply for a cleansing medium, such as a disinfectant, to the teat cup, in particular to a teat present in the teat cup, the supply comprising a line having an end portion with discharge end, and each milk extractor being provided with means for closing off the passage of the milk extraction at or downstream of the discharge end of the line for cleansing medium, preferably at that level, when discharging the cleansing medium, the closing means comprising a reciprocating closing body that can be moved between a position leaving the passage of the milk extractor free and a position closing it off, the closing body being provided with a squirt line forming the end portion with discharge end of the line for supply of cleansing medium, and being positioned to debouch into the milk extractor, particularly the milk line, when in the closing-off position

29 Claims, 7 Drawing Sheets

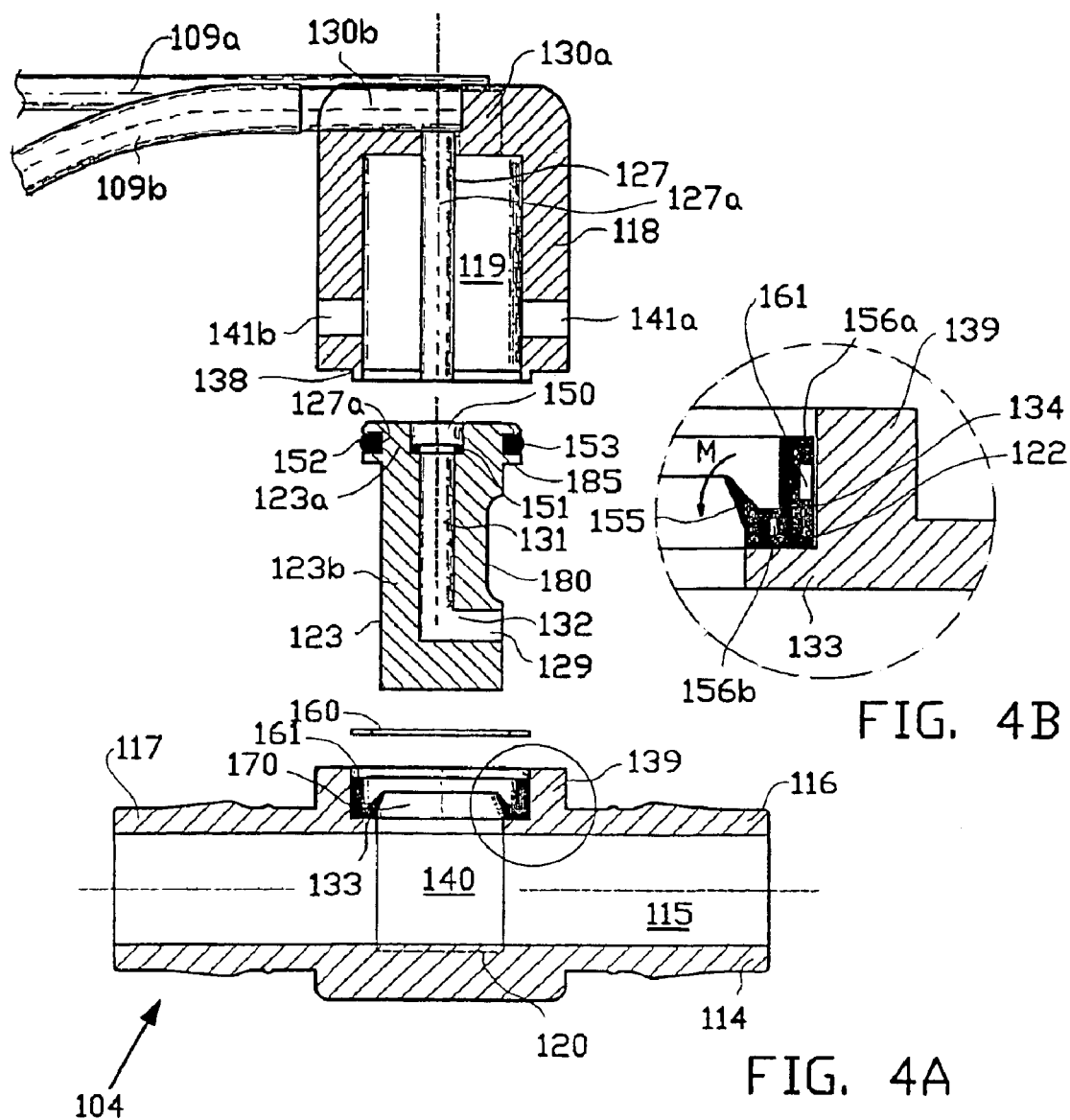
FIG. 4B
FIG. 4A
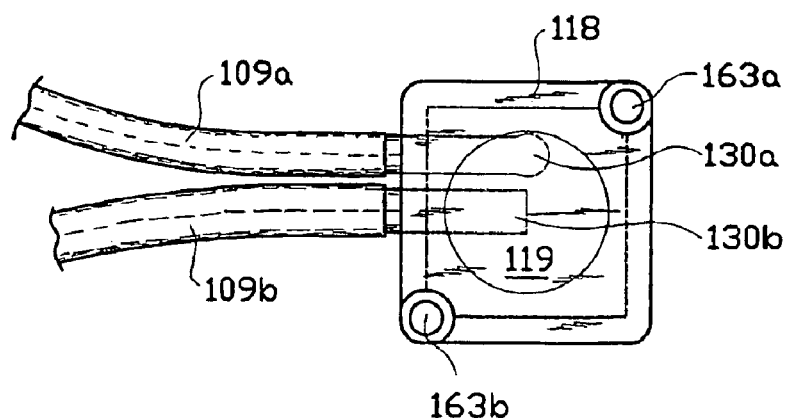
FIG. 4C

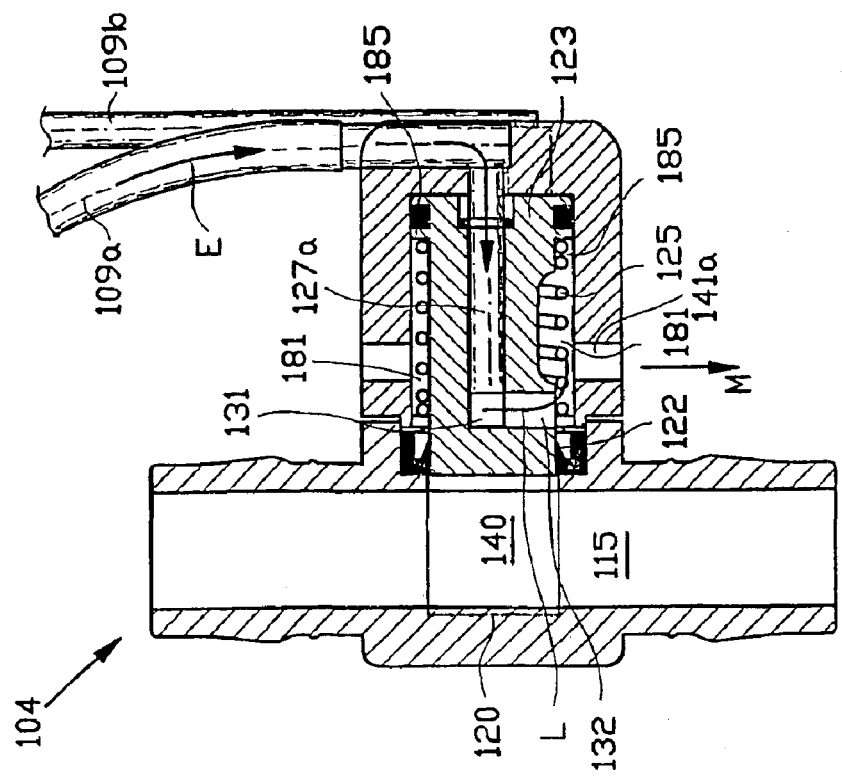
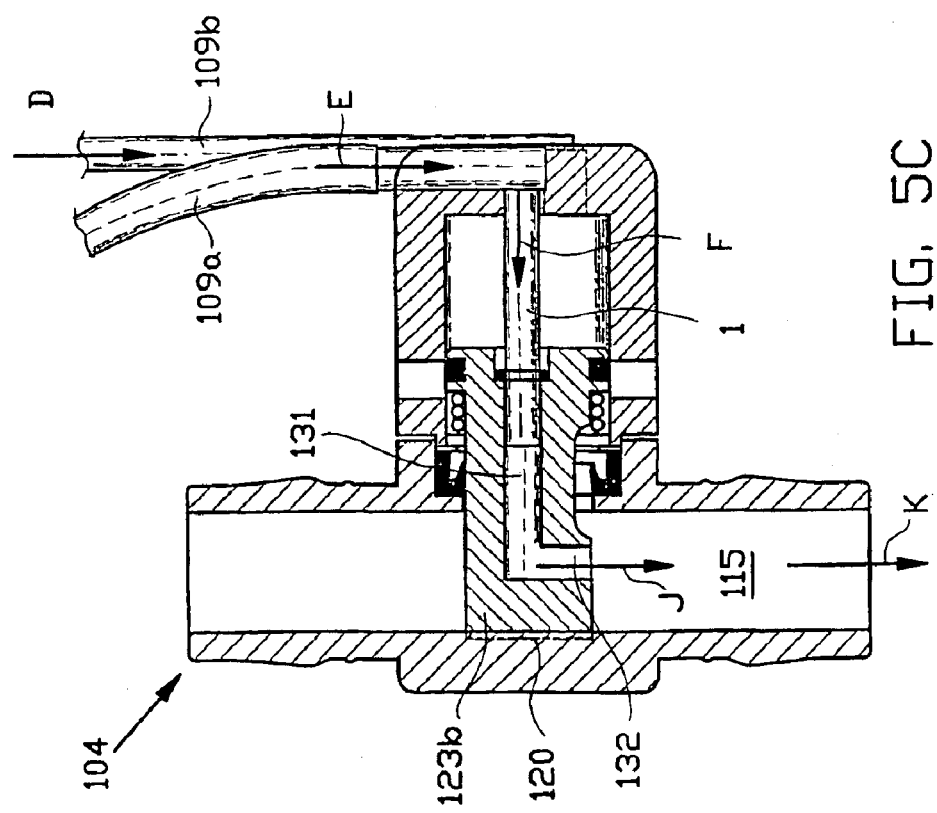
FIG. 5D
FIG. 5C

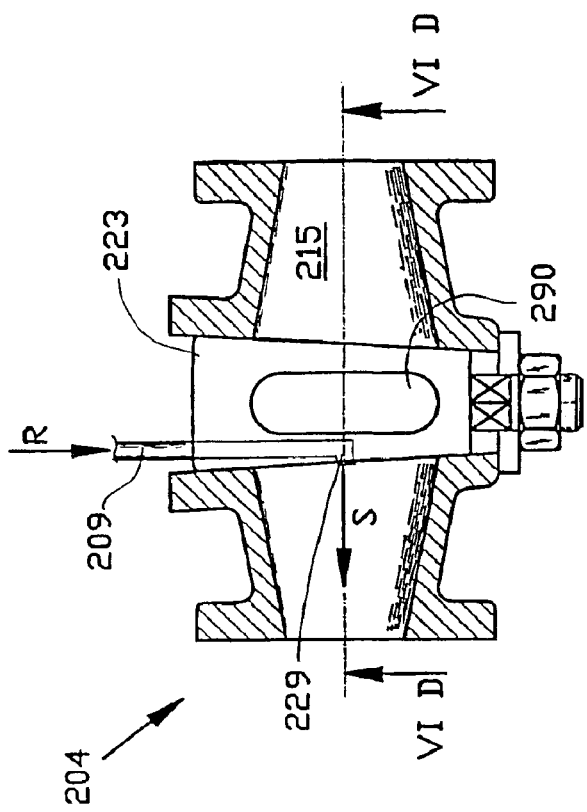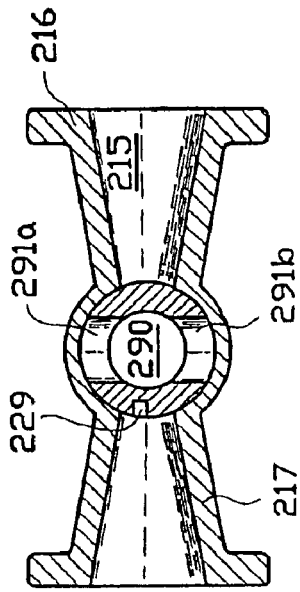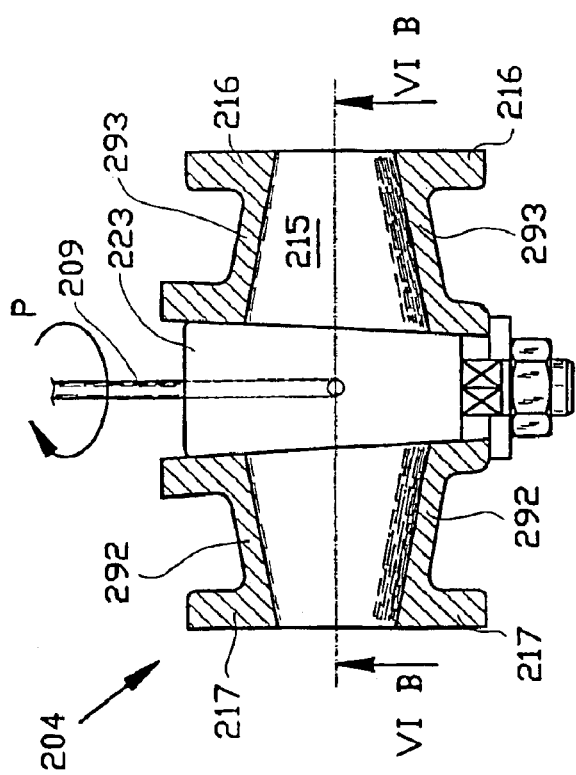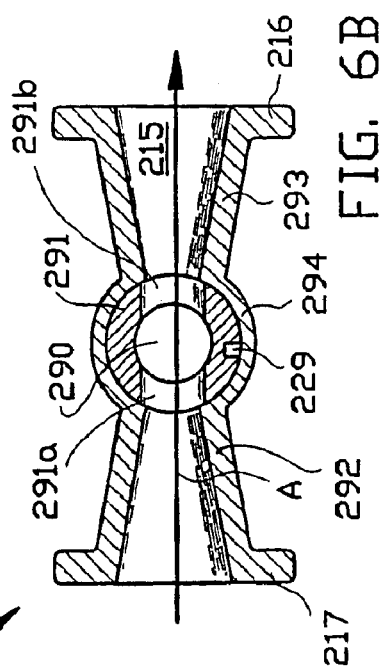

MILKING DEVICE PROVIDED WITH CLEANSING MEANS

This application is a continuation of application No. PCT/NL01/00699, filed Sep. 21, 2001.

The invention relates to a milking device provided with cleansing means, in particular for cleansing/disinfecting the teat to which the milking device is connected.

BACKGROUND OF INVENTION

From German patent application 26 22 794 such a device and method are known. This document shows a milking device for pneumatically milking a cow and subsequent cleansing or disinfecting the teats of the cow's udder, with a system of four milk extractors, each comprising a teat cup which at one end is provided with an open lining and with the other end is connected to a milk line to a common milk collection chamber for the milk from the cow in question, each cup having a connection to a source of changing vacuum, and an outflow opening of a line for the supply of cleansing liquid being arranged in the wall of a teat cup.

When using this known device the method used is to first place the teat cups around the cow's teats, after which the cow is milked by means of the changing vacuum. After finishing milking the cow, while the cow's teats are still in the teat cups, a certain quantity of cleansing liquid is squirted into the teat cup by means of a pump. Said liquid will disinfect the teat and the space in the teat cup, but will subsequently together with the milk residue in the teat cup deposit on the inner wall of the teat cup. The liquid will then have the chance, even before the teat cups have been removed from the teats, to go back past the inner wall or from the teat back down and thus partially end up in the milk line. As a result milk residues of a cow will not only be left in the teat cup and milk line but will thus also transfer a contamination from the one cow to the other. Moreover, when milking the next cow residues of the cleansing liquid that have ended up in the milk line will subsequently end up in the central milk storage to which it is connected and therefore in the milk to be delivered.

A number of suggestions for improvements of this have been described in applicant's earlier International patent application WO 99/66787. In both of these suggestions use is made of a leaf spring, which in the unloaded situation abuts the inner surface of the milk extractor and then closes off a supply chamber for cleansing medium, and which in a loaded situation closes off the passage in the milk extractor to the downstream portion thereof and clears the way for supplied pressurized (by compressed air) cleansing medium. In that way when discharging a cleansing medium, and the aforementioned problem therefore exists, it is counteracted that during discharging the cleansing medium said medium may end up in the milk line and thus in the milk collection chamber. In a first embodiment, the spring leaf is operated by means of a pusher, which is connected to a separate pressure line.

In a second embodiment, which is simpler as to construction, the leaf spring is directly operated by the pressure of the cleansing medium itself.

SUMMARY OF INVENTION

It is an object of the invention to improve on this.

A further object of the invention is to provide a milking device, with which in a reliable or positive manner a closure can be realised and maintained for and during discharging cleansing liquid in a milk extractor, particularly teat cup and contiguous line portion.

A further object of the invention is providing a milking device, with which it can almost entirely be ruled out that cleansing medium is discharged before the closing of the passage is completed as a result of which cleansing medium might otherwise end up in the milk.

A further object of the invention is a device of the kind mentioned in the preamble with which in a reliable manner cleansing medium cannot be discharged until the passage in the milk extractor is closed off.

At least one of these objects is achieved according to the invention with a device for pneumatically milking a cow, comprising a number of milk extractors, each comprising a teat cup as well as a milk line connected to the lower end of the teat cup, which leads from the teat cup to a collection chamber for the milk from the teat cups, each milk extractor being provided with a supply for a cleansing medium, such as a disinfectant, to the teat cup, in particular to a teat present in the teat cup, the supply comprising a line having an end portion with discharge end, and each milk extractor being provided with means for closing off the passage of the milk extractor at or downstream of the discharge end of the line for cleansing medium, preferably at that level, when discharging the cleansing medium, the closing means comprising a movable closing body that can be moved between a position leaving the passage of the milk extractor free and a position closing it off, the closing body being provided with a squirt line forming the end portion with discharge end of the line for supply of cleansing medium and being positioned to debouch into the milk extractor, in particular the milk line, when in the closing position.

By accommodating the end portion of the supply line of cleansing medium in the closing body the mutual position of them both is fixed and known. With known movement of the closing body it can be ensured in a simple manner by suitable selection of the location of the discharge opening of the squirt line that the discharge can take place at the correct moment with, an actually closed off passage.

Preferably the device is provided with means for pneumatically moving the body. The device may comprise a compressed air connection to the supply line for the supply of cleansing medium. In an embodiment, said compressed air line may be used for the movement of the closing body. In another embodiment these functions may be separated, in two separately operable pressure lines.

In a first further development of the device according to the invention the closing body is movable between the free position and a closing position by means of a reciprocating movement, A simple failure-free embodiment is one in which the closing body is formed by a—preferably free—piston that is bearing mounted in a sliding manner in a chamber debouching in the milk extractor and preferably is positioned transverse to it. A free piston is easy to manufacture and mount, and moreover takes up little length of place.

In case the piston is a free piston it can advantageously be provided at its inner end with a duct in which a fixed pin extends, the duct being part of the squirt line. The pin cannot only form a guidance means for the piston, but also ensure a relative closing of the duct and thus the squirt line during the (fast) pressure build-up in the end chamber and the movement of the piston.

At its inner end the piston may be provided with a sealing for sealing against the inner surface of the chamber, a supply line for at least compressed air debauching in the chamber in its portion opposite the inner side of the piston. Alternatively or additionally the chamber near the connection to the milk extractor can be provided with a sealing for sealing engagement of the piston's circumference, at the side of the piston facing away from the milk extractor. Thus pressure build-up and the subsequent movement of the piston can take place in the chamber, without leakage of cleansing medium.

The piston may have a circular cross-section, the duct being arranged eccentrically in the piston, as a result of which undesirable rotation of the piston (and thus of the discharge opening) is counteracted. Alternatively rotation of the piston may be prevented by using a piston of a cross-section that is not round. The chamber and milk extractor passages are then complementary fittingly formed.

The piston is arranged/indexed to always discharge the cleansing medium in the correct direction when cleansing.

The device can also be used for rinsing the milk extractor, upstream of the closing of the milk line, when it is further provided with means for passage of water, particularly in the form of a pulsating water/air mixture, through the supply line to the discharge end.

The piston may also have a narrowed portion, situated at radial distance from the inner surface of the chamber, the sealing provided at the chamber engaging about the narrowed piston portion. As a result a space is created which when necessary is easy to clean or rinse, as will be explained later. Furthermore a space is created for a possible (coil) spring.

Preferably said sealing is a ring having a sealing lip oriented to the chamber inner side, as a result of which it is prevented that residues of particularly the cleansing medium that are at the inner side of the sealing, are sucked towards the milk line during milking as a result of the pulsating vacuum in said line.

Preferably the discharge opening in the piston is substantially radially oriented, preferably in a direction substantially parallel to the passage of the milk extractor and towards the teat cup.

In case the piston, in the retracted, free position, opens with the discharge opening at the inner side of the sealing, and the sealing is active around a piston end situated outside of it, it is prevented that during milking possible residues in the discharge opening are sucked into the milk line.

Preferably the piston is provided with a recess, duct or the like, on a portion at the inner side of the discharge opening, for fluid communication in the closed-off position of the space in the milk extractor upstream of the closing body and the chamber. As a result cleansing medium, that falls back onto the piston and—because of the closing—cannot go further into the milk line, can run down to the chamber, which to that end preferably is provided with drainage holes.

In a simple constructive manner the recess can be a levelling in the surface of the piston.

It is further preferred that the milk extractor is provided with a chamber for fitting accommodation of the end of the closing body in a position completely closing off the milk extractor, so that it is once more additionally prevented that cleansing medium flows past the closing body. Furthermore the milk extractor can-be provided in the inner surface with means for guiding the closing body, so that the action of the piston is further improved.

In a further embodiment the device is furthermore provided with means, such as a spring, for biassing the closing body in the closing-off, cleansing position towards the free, milking position (also see above). Thus it can be ensured that the piston/the closing body moves back to the starting position, in which the passage is free, particularly immediately after discharge of cleansing medium has been stopped. Alternatively use can be made of putting the line for the cleansing medium on a vacuum.

In a first further development of the device according to the invention the pin has a passage for—preferably permanent—fluid communication of the duct to the supply line, the means for pneumatically moving the body also being formed by a pressurized air or compressed air line separate from the supply line. It is then prevented that cleansing medium ends up at the inner side of the piston.

In an alternative further development the means for pneumatically moving the body are also formed by the pressurized cleansing medium. When the said pin, but then without passage, is used, it may be shortened, so that it closes off the duct in the piston in a first section and then no discharge of cleansing medium from the squirt line takes place. When the piston is in the closing position the pin will have come out of the opening of the duct, so that pressurised cleansing medium will go through the duct in the piston and will squirt out of the discharge opening. It is preferred here that the discharge opening is situated at such a distance from the end of the closing body that it is not released in the passage of the milk extractor until the body has closed off the passage of the milk extractor completely.

In an alternative embodiment the closing body is movable between the free position and the closing-off position by a rotational movement. The closing body can then be provided with a milk passage which in the free position is in open line with the milk flow paths in the milk extractor. The rotation can take place about an own axis of the closing body, particularly transverse to the milk line.

From a further aspect the invention provides a device for milking a cow, comprising a number of milk extractors, each defining a milk passage and comprising a teat cup as well as a milk line connected to the lower end of the teat cup, which line leads from the teat cup to a collection chamber for the milk from the teat cups, each milk extractor being provided with a supply for a cleansing medium, such as a disinfectant, to the teat cup, in particular to a teat present in the teat cup, the supply having a discharge nozzle, which is a part of a closing body for the milk passage, which closing body is movable between a position leaving the milk passage of the milk extractor free and a position closing it off, the discharge nozzle being positioned to debouch into the milk extractor, in particular the milk line, when in the closing position.

In all preceding embodiments the end portion of the discharge end or the discharge nozzle can advantageously be positioned to be closed off from either the milk extractor or the milk passage when in the free position.

In a very simple and easy to place—also afterwards— embodiment, the closing means are accommodated in a coupling piece which is accommodated in the milk extractor, preferably near the transition between the teat cup and the (flexible) milk line.

The invention also relates to such a coupling piece, as well as to an assembly of a number of devices according to the invention and a central milk storage connected to the milk collection chamber.

From a further aspect the invention provides a method for milking a cow, the milk discharge being closed off after milking by moving a closing body from a position keeping the milk discharge open to a position keeping the milk discharge closed off, cleansing medium being discharged via the closing body, by squirting in the milk discharge towards the teat cup, the teat cups being released, and while keeping the closing body in the closed off position, squirting a pulsating water/air mixture via the closing body for rinsing the milk extractor.

Preferably when the teat cups are still attached to the cow, in the closed position of the closing body, cleansing medium falling back on the closing body is deflected from the side of the closing body facing the teat cup to a chamber, particularly a chamber in which the closing body can be accommodated in the open position.

Preferably the closing body is subsequently moved to the open position, in which the chamber is sealed with respect to the milk discharge, and subsequently a water/air mixture is discharged again via the closing body, for rinsing the chamber, the rinsing liquid escaping via drainage holes.

Thus it is ensured with simple means that no residues of cleansing medium are left behind.

From a further aspect the invention provides a device for pneumatically milking a cow, comprising a number of milk extractors, each comprising a teat cup as well as a milk line connected to the lower end of the teat cup, which line leads from the teat cup to a collection chamber for the milk from the teat cups, each milk extractor being provided with a supply for a cleansing medium, such as a disinfectant, to the teat cup, in particular to a teat present in the teat cup, the supply comprising a line debouching in the milk extractor, in particular the milk line, at the location of a discharge end, and each milk extractor being provided with means for closing off the passage of the milk extractor at or downstream of the discharge end of the line for cleansing medium, preferably at that level, when discharging the cleansing medium, the closing means comprising a reciprocating closing body which in the discharge end can be moved between a position leaving the passage of the milk extractor free and a position closing it off, the closing body being provided with a squirt line forming the end portion of the line for the supply of cleansing medium.

Below the invention will be further elucidated on the basis of two exemplary embodiments shown in the attached drawings, in which:

BRIEF DESCRIPTION OF THE DRAWINGS

FIGS. 4A–C show a second embodiment of a coupling piece according to the invention, a cross-section in disassembled situation, a detail of a sealing ring in it, and a top view of the chamber part of the coupling piece, respectively;

FIGS. 5C and 5D show the coupling piece of FIGS. 4A–C in milk line rinsing position and chamber rinsing position, respectively, and;

FIGS. 6A,B and 6C,D show a third possible embodiment of a coupling piece for a device according to the invention, wherein the coupling piece is shown in the milking position and the cleansing position, respectively, in (partial) cross-sections in two longitudinal planes perpendicular to each other.

DETAILED DESCRIPTION

Figure 1:
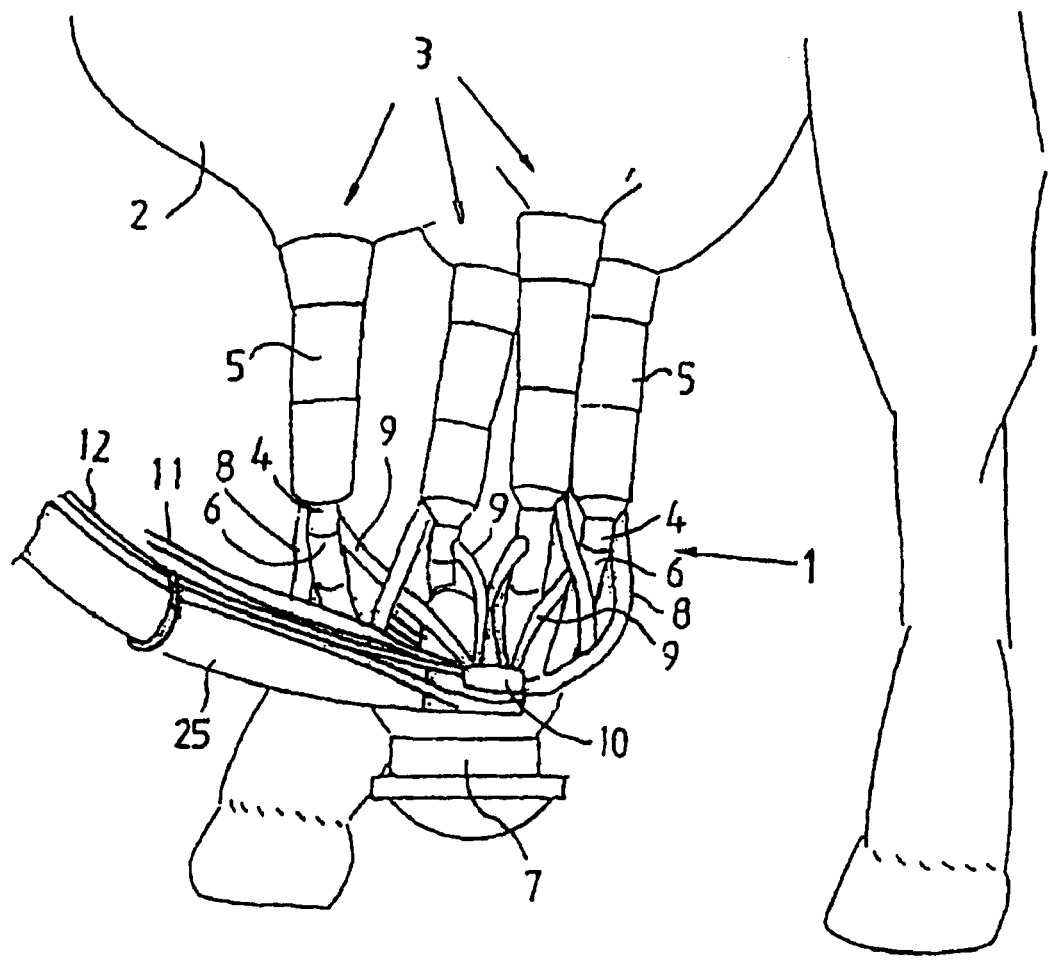
FIG. 1 is a device according to the invention arranged under a cow.

FIG. 1 shows a cow of which only the hind legs have been drawn with an udder 2 and four teats 3, in which a device 1 according to the invention has been arranged under the teats 3 of the udder 2 of the cow.

The device 1 for pneumatically milking the cow comprises four milk extractors, which each comprise a teat cup 5 and a milk line 6, in which between the teat cup 5 and the milk line 6 a coupling piece 4 according to the invention has been arranged. The milk lines 6 supply the milk to a milk collection chamber 7, from where the milk is transported to a central storage via a common discharge line 25. Each teat cup 5 is connected via a line 8 to a source of changing vacuum, by means of which the milking is carried out. Each coupling piece 4 is provided with a supply line 9, which is connected to a manifold 10 for cleansing liquid, such as iodine, which is supplied via a line 11. Via the line 12 the air is supplied under pressure to the manifold 10 in order to blow the liquid under the influence of the pressure of the air into the teat cup.

Figure 2A:
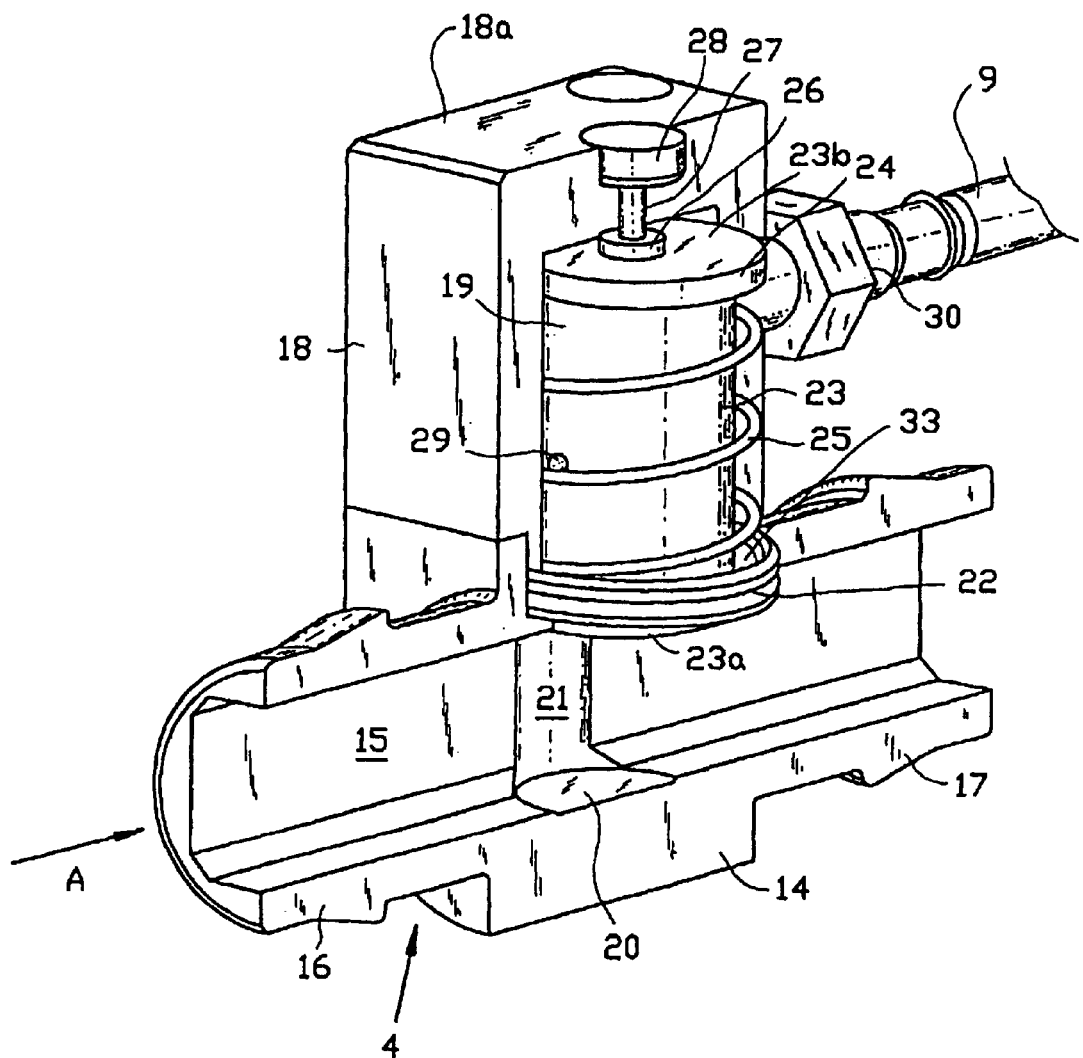
FIGS. 2A and 2B show cross-sections in isometric view of a first embodiment of a coupling piece according to the invention, in the milking position and in the cleansing position, respectively.

The coupling piece 4 shown in FIG. 2A has a housing 14 made of synthetic material, having a connection end 16 to which the teat cup 5 can be connected, and a discharge end 17, to which the milk line 6 can be connected. The housing 14 forms a passage 15 for milk coming from the direction A, so that it may continue flowing from the teat cup to the milk line 6.

The coupling piece 4 is provided with extension 18, in which a chamber 19 is formed, in which a free piston 23 has been accommodated. The chamber 19 has been provided with a connecting nipple 30 for the line 9. The piston 23 is straight circle-cylindrical and provided with a flat end 23a and an inner end 23b widened with flange 24. At the inner end 23b a duct opening 26 is situated eccentrically with respect to the circle-cylindrical body of the piston 23, in which opening a pin 27 extends, which with widened head 28 is secured in the wall 18a. The flange 24 leaves a slit space open with respect to the inner surface of the chamber 19.

Where the chamber 19 debouches in the passage 15 a ring shoulder 33 and a sealing ring 22 have been accommodated in the wall of the housing 14. Said sealing ring 22 sealingly engages the outer surface of the piston 23, but makes movement along it possible.

Figures 3A, 3B:
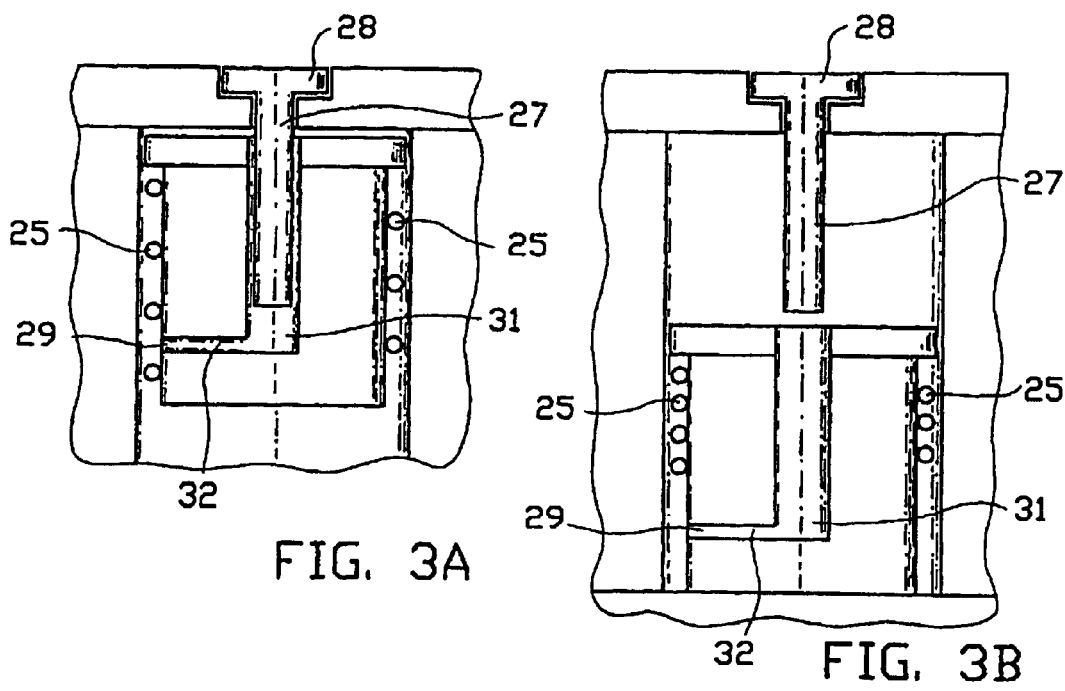
FIGS. 3A and 3B show cross-sections of a piston in the coupling piece of the FIGS. 2A and 2B, in the milking position and in the cleansing position, respectively.

As indicated in FIG. 3A the piston 23 is internally provided with a duct 31 extending in axial direction, which duct near its bottom merges in radial direction in a little duct 32, which ends in discharge opening 29. The eccentricity of the duct 31 and of the pin 27 is such that the discharge opening 29 and the little duct 32 are oriented parallel to the centre line of the passage 15, and will remain so. The pin 27 fits (very) snugly in the duct 31. When milking has ended and the teat cups 5 are still around the teat of the cow, control means that are not further shown pressurize the line 9 with a mixture of air and cleansing medium. Via connecting nipple 30 it (B) enters chamber 19, as considered in the drawing below the flange 24. The connecting nipple 30 may alternatively also be arranged in the upper wall of the chamber 19 as considered in the drawing, but the exemplary embodiment shown is more efficient in the use of space and line length. The line 9 will after all first extend from below upwards.

The pressure prevailing in the line 9 will also be present at the inner surface 23b of the piston 23. As a result the piston 23 will be slid out of the chamber 19. During the movement of the end 23a transversely, through the passage 15, the piston 23 is guided on both sides by guidance grooves 21 made in the wall of the housing 14. The movement of the piston 23 will take place very quickly, in which it should be considered that the pressure used could be approximately 5 Bar. Finally the end 23a end up in the cavity 20, in which it is accommodated in a snugly fitting manner. At that moment the pin 27 has come out of the duct 31. The surface of the smallest passage of the duct 31/little duct 32 is smaller than the one of the nipple 30, so that no discharge will take place before the piston 23 has moved out completely. The discharge opening 29 has then just become exposed in the passage 15, which further contributes to the prevention of premature discharge. The pressure prevailing in the chamber 19 can no longer have the effect that the piston 23 moves further, so that said pressure is entirely used for discharging cleansing medium, via chamber 19, access 26, duct 31, little duct 32 and finally discharge opening 29 in the direction C, towards the teat cup 5. The piston 23, a kind of sliding cock as it were, here completely closes off the passage 15, so that there is no danger that cleansing medium ends up in the milk line 6. The fitting of the piston between the grooves 21 and the cavity 23 is so snug, that the—intended—operation movement of the piston is possible, though that leakage of liquid past the piston is prevented.

Then the teat cups are removed from the teats but the pressure in line 9 is still maintained, until the milk cups are situated in hanging position, so that the cleansing liquid can leak out of the teat cups.

After a short while the pressure in the line 9 is released, after which the piston 23 can move again to the initial position, the milking position, under influence of a spring 25, which under the influence of the pressure in the chamber 19 was kept pressed in between the flange 24 and the ring 33. Instead of the spring 25 the line 9 can be put on vacuum B', in order to thus, as it were, suck back the piston 23. During milking said vacuum B' is then maintained.

The coupling piece 104 shown in FIGS. 4A–C corresponds to some extent to the coupling piece 4 discussed above, though differs from it on some points. As can be seen in FIG. 4A there is question here of a housing 114 made of synthetic material, having a passage 115, a connection end 116 and a discharge end 117. A circular collar 139 is formed on the housing 114, the collar having a passage 170 that is transverse to the passage 115 and is in open connection to it. The passage 170 is limited by a shoulder 133 and an edge 134 above it, on which a sealing ring 122 is placed. Said sealing ring 122 is further shown in FIG. 4B, and has an outer ring 156, which to the inside merges in a wedge-shaped lip 155 that is formed as a unity with it. The ring 155 is able to deform in the direction M for the sealing. The ring 122 is made of suitable rubber material, in which metal reinforcement rings 156a and 156b have been integrally formed. The top side of the ring 156 forms a shoulder 161, on which a metal support ring 160 may come to lie. Said metal support ring 160 forms a stop for the pressure spring 125 (FIG. 5A), and also protects the ring 122 against damage by the spring.

The housing 114 is furthermore provided with a transverse guidance 140, that is formed complementary to the free piston 123 yet to be discussed. Said recess 140 is situated at two diametrically opposite sides of the inner wall of the passage 115. In the wall portion that is situated opposite the passage 170 a shallow recess 120 is formed, for accommodation of the end of the piston 123, in the cleansing position.

The free, in this example substantially straight circle cylindrical piston 123 is provided with a duct 131 extending in axial direction, that is turned at right angles to a little duct 132, that ends in discharge opening 129. In the widened inner end 123a of the piston 123 a shoulder 151 is formed in the duct 131, for accommodation of an O-ring 152. Above it a passage 150 is situated, in which pin 127 yet to be discussed can easily be inserted. At the circumference of the widened inner end 123a of the piston 123 a shoulder 185 is situated and above it a circumferential groove 152, in which an O-ring 153 is placed. As can be seen in FIG. 4A the piston 123 has a narrowed portion 123b below the widened inner end 123a. In the narrowed portion 123b, at one side, at the side where the sealed opening 129 is situated, a flat surface 180 is arranged forming a recess with respect to the circumference of the narrowed portion 123b.

In the upper part of FIG. 4A the extension 118 is shown forming a straight circle cylindrical chamber 119, and at the lower end or outer end being provided with a collar 138, that snugly fits in the edge 134 also lying on support ring 160. The extension 118 can be glued to the housing 114 and/or by means of screws (not shown) that are to be inserted into holes 163a,b.

Fixedly attached in the extension 118 is a pin 127, forming a continuous duct 127a, that is in communication with the supply hose 109a, for, at choice, compressed air, water and cleansing medium, such as iodine. As can be seen in FIG. 4C said line 109a ends in connection 130a eccentrically with respect tot he chamber 119, and thus the pin 127 is also eccentric, just like in the example discussed earlier. A difference now is that here a separate line 109b is present for compressed air, with which in the assembled situation, a delivery pressure can be put on the top side or inner side of the piston 123—via centric connection 130b—, for axial movement of the piston 123. Said pressure hits the inner surface of the widened head 123a of the piston 123, and said pressure cannot leave as a result of the O-ring 153.

At the opposite side the extension 118 is further provided with drainage holes or drainage slits 141a, 141b, that open in the free atmosphere.

Figure 2B:
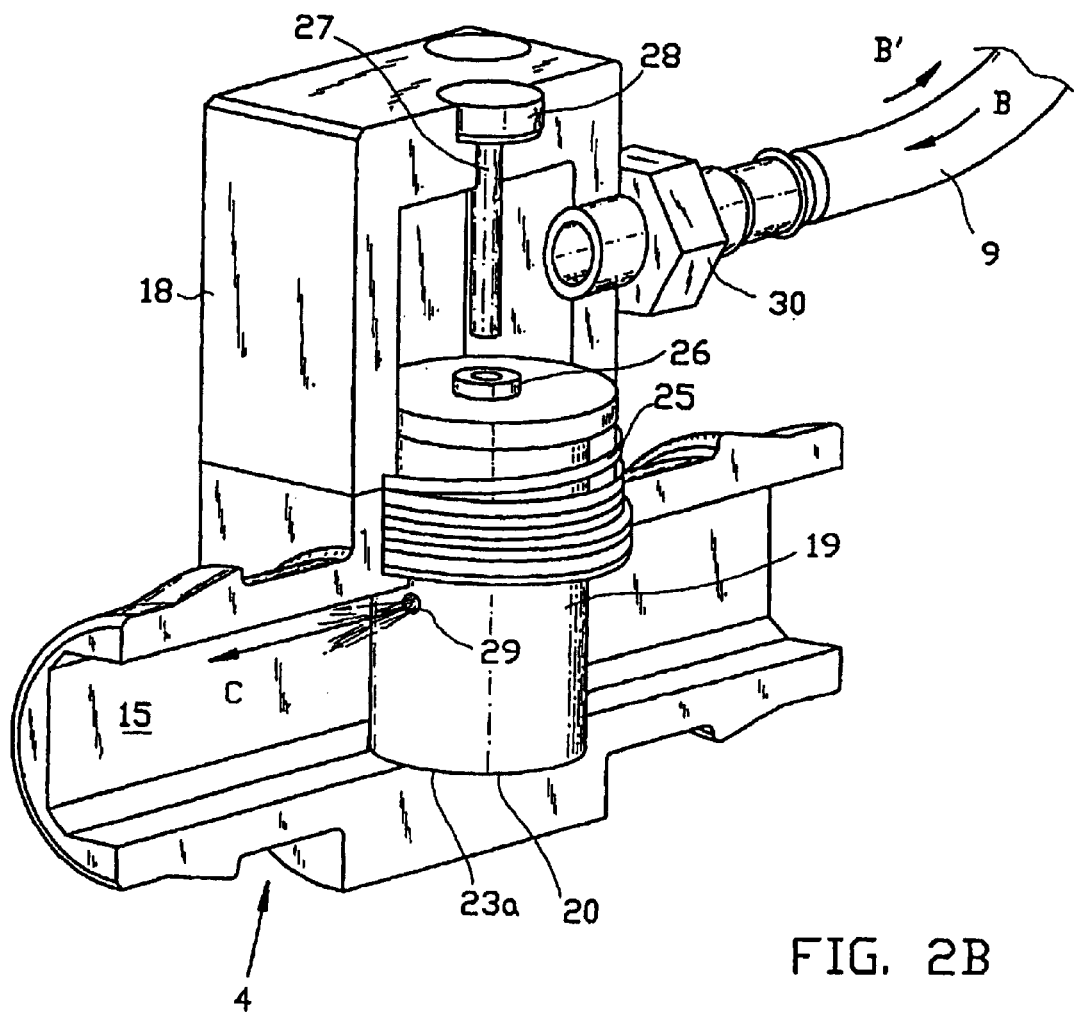
Figure 5B:
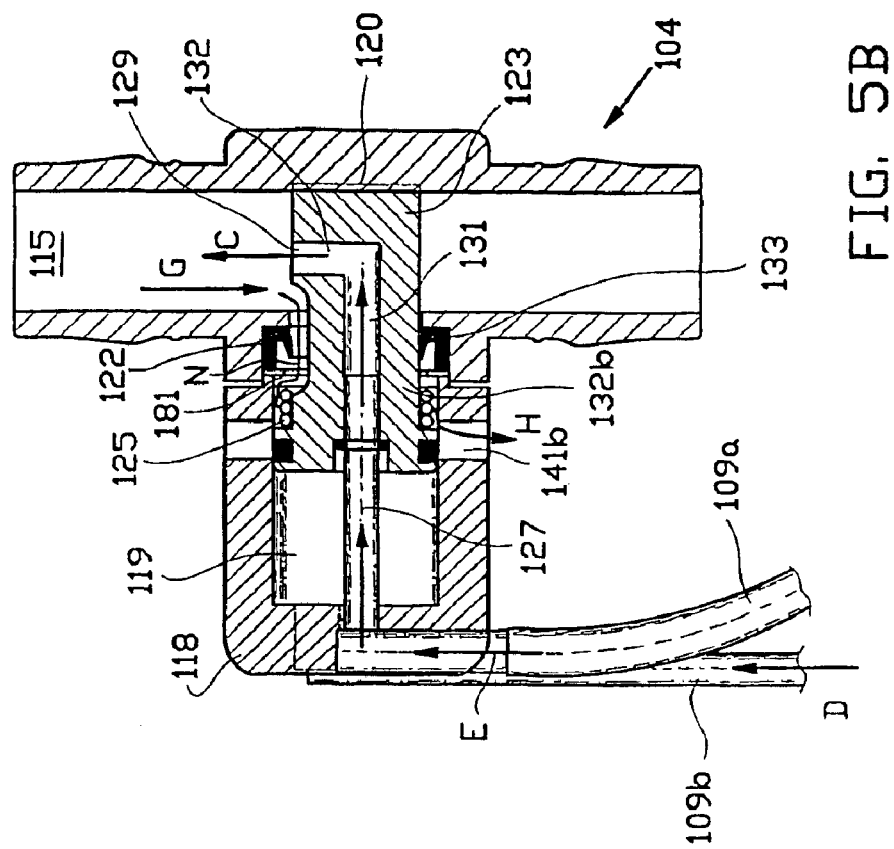
FIGS. 5A and 5B show the coupling piece of FIGS. 4A–C in milking position and cleansing position, respectively.
Figure 5A:
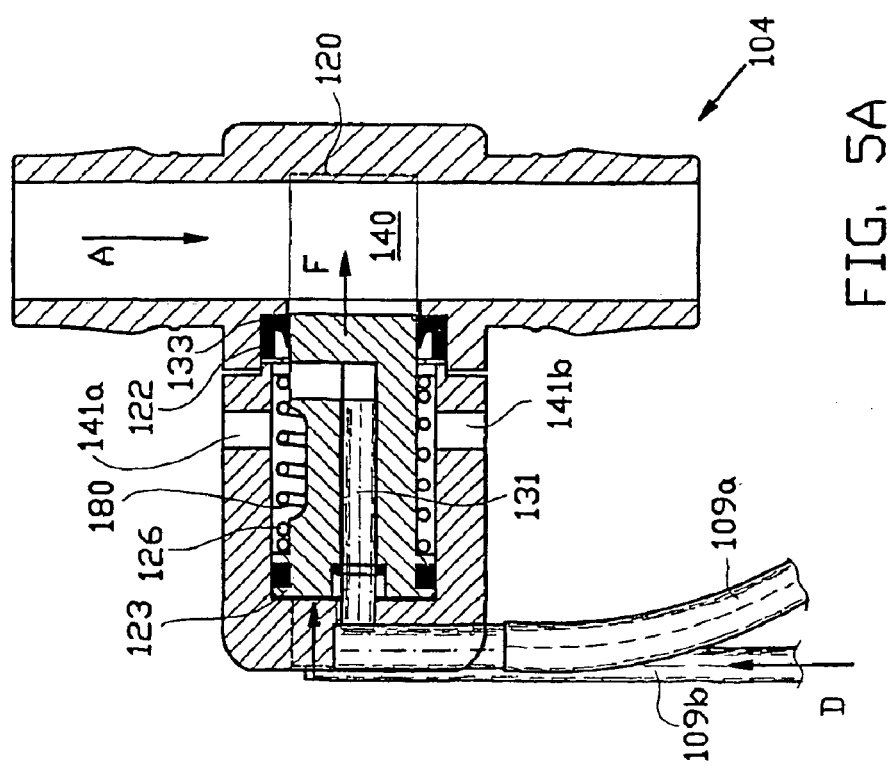

In FIG. 5A the situation immediately after milking is shown. The last milk has flown down in the direction A. Then compressed air from the direction D is supplied via line 109b, as a result of which, for the above-mentioned reasons, the piston 123 is urged in the direction F. Guided by the guidances 140 the piston finally arrives with its end in shallow recess 120, and because of the snugly fitting design the passage 115 is then closed off, in correspondence with the situation of FIGS. 2B/3B.

The situation shown in FIG. 5B is then achieved, and when the milk line is still attached to the teat of the cow via the teat cup, while maintaining the pressure in line 109b, a mixture of air and cleansing medium can be discharged via line 109a in the direction E. This then arrives in pin 127 via the duct 127a, through O-ring 152, without leakage in duct 131, in little duct 132 and finally said mixture comes out of discharge opening 129 in the direction C, forcefully to the teat and the teat cup.

Special now is that moisture falling back, in which iodine might be present, may fall on the portion of the piston 123 extending in the passage 115, in the direction G, but that as a result of the short-circuiting made by the flattening 180, said moisture can go past the lip 155 in the direction N, to the space 181 that is present between the narrowed portion 123b and the wall of the extension 118. The distance between the widened portion 123a, in particular the O-ring 153 and the piston end on the one hand and the distance between the drainage holes 114a,b with respect to said same end is such that a leakage path remains and the residual moisture can get to the outside via the drainage holes (arrow H). Here the moisture is able to flow around the narrowed portion 123b of the piston. Thus it is (further) counteracted that cleansing medium ends up at the other side, the milk collection side, when retracting the piston.

After the cleansing medium is discharged in this way the pressure in line 109b is maintained, and as is shown in FIG. 5C, a pulsating mixture of water/air is discharged in the direction E. The teat cups however have been disconnected then, as a result of which they will hang down. The coupling piece 104 will therefore be inverted with respect to the FIGS. 5A and 5B. The rinsing medium flows in the direction I, through the duct 127a in the pin 127, through the ducts 131, 132 and flows out in the direction J, downwards through the discharge opening 129. In the direction K the rinse water can continue its way to rinse the connected teat cup.

After that the pressure is lowered on the line 109b, so that under the action of the spring 125, on the one hand supporting against shoulder 185 at the widened inner end 123a of the piston 123 and on the other hand supporting against the ring 160, again entirely to the inside, so that the passage 115 is entirely free again. Special now is that rinsing water can be supplied in the direction E through the duct 109a, which rinsing water flows via the pin 127 then accommodated in the duct 131, the pin 127 being short enough for the rinsing water to enter the little duct 132, in order to come out in the direction L and then flowing around the narrowed piston portion 133b and the spring 125 to finally come out through the now lowermost drainage hole 141a in the direction M. The sealing ring 122 with lip 165 here ensures that no rinsing water with possible iodine residues ends up in passage 115.

After that, the pressure is released from the line 109a, and the situation shown in FIG. 5A is achieved, in which milking can take place again. During milking, the lip 155 ensures that as a result of the vacuum in the milk line, no possible residues can get from the chamber 119 in the passage 115.

In the alternative embodiment shown in FIGS. 6A–D a coupling piece 204 is first shown in FIGS. 6A,B having an input end 217 situated at the teat cup side and an end 216 leading to the milk collection chamber, in which coupling piece a milk passage 215 is formed.

The coupling piece 204 has a circular cross-section at the ends 216 and 217, which however in the cross-section of FIGS. 6B,D taper with walls 292, 293, and in the cross-section in FIGS. 6A,C flares of towards the middle of the coupling piece 204. The walls 292 and 293 there merge in a truncated conical space, formed by cone walls 294. A truncated conical closing body 223 is accommodated rotatable about its centre line and snugly fitting in said conical space. Said closing body 223 has an inner cavity 290 limited by wall 296 in which two holes 291a, 291b are formed that are situated diametrically opposite each other. As can clearly be seen in FIG. 6C a duct 227 extends through the closing body 223, which duct is connected to a line 209 for compressed air/cleansing medium, and possibly water. The duct 227 is turned at right angles in order to debouch in passage 215 at the location of the discharge opening 229, coinciding with the centre line of passage 215 and directed towards the end 217.

The closing body 223 is attached in the coupling piece 204 with suitable means, such as for instance a threaded end/bolt, washer connection, against movement along its centre line. Other means, and sealing rings where needed, can be provided. This embodiment is meant to be schematically shown.

In the situation shown in the FIGS. 6A,B, milk can flow in the direction A of the teat cup, through the passage 215, through hole 291a, space 290, hole 291b and further to a milk collection point.

When milking is completed the closing body 223 is turned in the direction P over 90° by means of remote controllable means that are not further shown. Then the situation shown in the FIGS. 6C,D is achieved, in which the discharge opening 229, which in the situation of the FIGS. 6A,B is either shielded or closed off by the cone wall 294, has been released and lies in the centre line of the coupling piece 204. Compressed air with cleansing medium is then supplied in the direction R through line 209, and squirts in the direction S out of the discharge opening 229.

What is claimed is:

1. Device for pneumatically milking a cow, comprising a number of milk extractors, each comprising a teat cup as well as a milk line connected to the lower end of the teat cup, said milk line leading from the teat cup to a collection chamber for discharging the milk from the teat cups, the device being provided with a supply for a cleansing medium to the teat cup for each milk extractor, the supply comprising a supply line having an end portion with discharge end, and each milk extractor being provided with closing means for closing off a passage of the milk extractor at a point in the passage that is at the discharge end of the supply line or at a point in the passage that is further downstream from the teat cups than the discharge end of the supply line, when the cleansing medium has been discharged through the outlet and into the milk extractor, the closing means comprising a reciprocating closing body that can be moved between a position leaving the passage of the milk extractor free and a position closing it off, the closing body being provided with a squirt line forming the end portion with discharge end for the line ensuring the supply of cleansing medium and being positioned to debouch into the milk extractor, when in the closing position.

2. Device according to claim 1, provided with means for pneumatically moving the closing body.

3. Device according to claim 1, furthermore comprising a compressed air connection to the supply line for supply of the cleansing medium.

4. Device according to claim 1, the closing body being moveable between the free position and the closing-off position by a reciprocating movement.

5. Device according to claim 4, the closing body being formed by a piston that is bearing mounted in a sliding manner in a chamber debauching in the milk extractor.

6. Device according to claim 5, the piston being a free piston and at its inner end being provided with a duct in which a fixed pin extends, the duct being part of the squirt line.

7. Device according to claim 5, the piston at the inner end being provided with a sealing for sealing against the inner surface of the chamber, a supply line for at least compressed air debauching in the chamber in its portion opposite the inner side of the piston.

8. Device according to claim 5, the piston having a circular cross-section and the duct being arranged eccentrically in the piston.

9. Device according to claim 1, furthermore being provided with means for passage of water, particularly in the form of a pulsating water and air mixture, through the supply line to the discharge end.

10. Device according to claim 5, the chamber near the connection to the milk extractor being provided with a sealing for sealing engagement of the circumference of the piston.

11. Device according to claim 10, the piston having a narrowed portion, situated at radial distance from the inner surface of the chamber, the sealing engaging about the narrowed piston portion.

12. Device according to claim 10, the sealing being a ring having a sealing lip oriented to the chamber inner side.

13. Device according to claim 5, the discharge opening in the piston being substantially radially oriented, preferably in a direction substantially parallel to the passage of the milk extractor and towards the teat cup.

14. Device according to claim 13, the piston having a narrowed portion, situated at radial distance from the inner surface of the chamber, the sealing engaging about the narrowed piston portion, the piston in the retracted, free position opening with the discharge opening at the inner side of the sealing, and the sealing being active around a piston end situated outside of it.

15. Device according to claim 1, the milk extractor being provided with a chamber for fitting accommodation of the end of the closing body in a position completely closing off the milk extractor.

16. Device according to claim 1, the milk extractor in the inner surface being provided with means for guiding the closing body.

17. Device according to claim 1, furthermore provided with means, such as a spring, for biassing the closing body in the closing-off, cleansing position towards the free, milking position.

18. Device according to claim 1, comprising means for putting the line for cleansing medium on a vacuum.

19. Device according to claim 5, the pin having a passage for fluid connection of the duct to the supply line, the means for pneumatically moving the body also being formed by a compressed air line separate from the supply line.

20. Device according to claim 1, the means for pneumatically moving the body also being formed by the pressurized cleansing medium.

21. Device according to claim 20, the discharge opening being situated at such a distance from the end of the closing body that it is not released in the passage of the milk extractor until the body has closed off the passage of the milk extractor completely.

22. Device for milking a cow, comprising a number of milk extractors, each defining a milk passage and comprising a teat cup as well as a milk line connected to the lower end of the teat cup, which line leads from the teat cup to a collection chamber for the milk from the teat cups, each milk extractor being provided with a supply for a cleansing medium to the teat cup, the supply having a discharge nozzle, which is a part of a closing body for the milk passage, which closing body being disposed at a point in the passage that is at a discharge end of a supply line for the supply or at a point in the passage that is further downstream from the teat cup than the discharge end of the supply line between a position leaving the milk passage of the milk extractor free and a position closing it off, the discharge nozzle being positioned to debouch into the milk extractor, when in the closing position.

23. Device according to claim 1, the end portion of either the discharge end or the discharge nozzle being positioned to be closed off from either the milk extractor or the milk passage when in the free position.

24. Device according to claim 1, the closing means being accommodated in a coupling piece which is accommodated in the milk extractor.

25. Coupling piece suitable for a device according to claim 24.

26. Assembly of a number of devices according to claim 1 and a central milk storage connected to the milk collection chamber.

27. Method for milking a cow, the milk discharge being closed off after milking by moving a closing body from a position keeping the milk dis-charge open to a position keeping the milk discharge closed off, clean-sing medium being discharged via the closing body, by squirting in the milk discharge towards the teat cup, the teat cups being released, and while keeping the closing body in the closed off position, squirting a pulsating water and air mixture via the closing body for rinsing the milk extractor.

28. Method according to claim 27, in which the cleansing medium is a disinfectant.

29. Device according to claim 5, in which the piston is bearing mounted in a sliding manner transverse to the milk line and in which the chamber is positioned transverse to the milk line.

* * * * *